US012152796B2

(12) United States Patent
Asiwaju et al.

(10) Patent No.: US 12,152,796 B2

(45) Date of Patent: Nov. 26, 2024

(54) PERFORMANCE PARAMETERIZATION OF PROCESS EQUIPMENT AND SYSTEMS

(71) Applicant: S.A. Armstrong Limited, Scarborough (CA)

(72) Inventors: Olatunji Asiwaju, Scarborough (CA); Peter Thomsen, Scarborough (CA)

(73) Assignee: S.A. Armstrong Limited, Scarborough (CA)

( * ) Notice: Subject to any disclaimer, the term of this patent is extended or adjusted under 35 U.S.C. 154(b) by 0 days.

(21) Appl. No.: 18/426,792

(22) Filed: Jan. 30, 2024

(65) Prior Publication Data

US 2024/0167712 A1 May 23, 2024

Related U.S. Application Data

(63) Continuation of application No. 17/987,207, filed on Nov. 15, 2022, now Pat. No. 11,920,811, which is a (Continued)

(51) Int. Cl.

*F24F 11/49* (2018.01)
*G07C 3/08* (2006.01)
*G07C 3/14* (2006.01)

(52) U.S. Cl.

CPC ................ *F24F 11/49* (2018.01); *G07C 3/08* (2013.01); *G07C 3/143* (2013.01)

(58) Field of Classification Search

CPC .. F24F 11/30; F24F 11/49; G07C 3/00; G07C 3/08; G07C 3/143

See application file for complete search history.

(56) References Cited

U.S. PATENT DOCUMENTS

| | | | |
|---|---|---|---|
| 6,257,007 | B1 | 7/2001 | Hartman |
| 6,823,680 | B2 | 11/2004 | Jayanth |

(Continued)

FOREIGN PATENT DOCUMENTS

| | | | |
|---|---|---|---|
| CA | 2894269 | C | 10/2015 |
| CN | 102395141 | B | 6/2014 |

(Continued)

OTHER PUBLICATIONS

International Search Report and Written Opinion dated Aug. 18, 2017 for PCT/CA2016/051420.

(Continued)

*Primary Examiner* — Tyler J Lee

(74) *Attorney, Agent, or Firm* — Bret E. Field; Bozicevic, Field & Francis LLP

(57) ABSTRACT

Performance mapping of equipment performance parameters by capturing, mapping, and/or structuralizing equipment performance data of a device for installation in a system. This includes generating performance maps which outline the expected feature performance parameter behavior of the equipment based on a set of operating parameters that capture the operating conditions. Each performance parameter on the map is representative of an operating point of specific operating conditions taken at a particular point in time. In one example, a performance parameter can be defined by an individualized set of parameter coefficients which in turn are dependent on instantaneous operating conditions. With the performance maps determined individually for devices as part of the system, and stored along with a time of testing, activities such as continuous commissioning, monitoring and verification, preventative maintenance, fault detection and diagnostics, as well as energy performance benchmarking and long term monitoring can be performed.

26 Claims, 8 Drawing Sheets

Related U.S. Application Data continuation of application No. 16/464,568, filed as application No. PCT/CA2016/051420 on Dec. 2, 2016, now Pat. No. 11,543,145.

(56) References Cited

U.S. PATENT DOCUMENTS

| | | | | |
|---|---|---|---|---|
| 9,115,909 | B2 | 8/2015 | McKie et al. | |
| 9,256,224 | B2 | 2/2016 | Herzog | |
| 9,405,666 | B2 * | 8/2016 | Kruglick | G06F 11/3684 |
| 9,835,594 | B2 | 12/2017 | Yoskovitz et al. | |
| 2009/0024239 | A1 | 1/2009 | Yoshioka et al. | |
| 2012/0173027 | A1 | 7/2012 | Cheng et al. | |
| 2013/0124111 | A1 | 5/2013 | McKie et al. | |
| 2013/0154839 | A1 | 6/2013 | Barton | |
| 2015/0127173 | A1 | 5/2015 | Chinnaiyan | |
| 2015/0184549 | A1 | 7/2015 | Pamujula et al. | |
| 2015/0330650 | A1 | 11/2015 | Abiprojo et al. | |
| 2016/0025578 | A1 | 1/2016 | Meirav et al. | |
| 2016/0138821 | A1 | 5/2016 | Shaull et al. | |
| 2016/0290671 | A1 | 10/2016 | Schuster et al. | |
| 2016/0377309 | A1 | 12/2016 | Abiprojo et al. | |

FOREIGN PATENT DOCUMENTS

| | | | |
|---|---|---|---|
| JP | 2003161495 | A | 6/2003 |
| KR | 101574590 | B1 | 12/2015 |
| KR | 20160035808 | A | 4/2016 |

OTHER PUBLICATIONS

Nelson, "Simulation Modeling of a Central Chiller Plant (CH-12-002)", Conference Proceeding by ASHRAE, Seminar 01-4—Estimating Potential Energy Savings in Central Energy Plants, Cooling Tower Fans and HPWH By Simulation Modeling, 2012.

Kallesoe et al., "Adaptive Selection of Control-Curves for Domestic Circulators", 2009, 4 pages.

Canadian Examiners Report for Canada Patent Application No. 3,020,762 dated Dec. 30, 2019, 4 pages.

Canadian Examiners Report for Canada Patent Application No. 3,020,762 dated Jan. 19, 2021, 7 pages.

Canadian Examiners Report for Canada Patent Application No. 3,020,762 dated Jul. 10, 2019, 3 pages.

Canadian Examiners Report for Canada Patent Application No. 3,020,762 dated May 6, 2021, 5 pages.

Canadian Examiners Report for Canada Patent Application No. 3,020,762 dated May 21, 2019, 3 pages.

Canadian Special Order Office Action for Canada Patent Application No. 3,020,762 dated Jan. 14, 2019, 6 pages.

Wang et al., Lab and Field Evaluation of Fault Detection and Diagnostics for Advanced Roof Top Unit, International Refrigeration and Air Conditioning Conference, West Lafayette, IN, United States, Jul. 11-14, 2016, Paper 1590, p. 1-12.

Katipamula et al., Automated Proactive Fault Isolation: A Key to Automated Commissioning, ASHRAE Transactions, 2007, vol. 113, Pt. 2, p. 40-51.

Search Report, Singapore Application No. 10202109539P, dated Oct. 13, 2022, 2 pages.

Written Opinion, Singapore Application No. 10202109539P, dated Oct. 17, 2022, 6 pages.

* cited by examiner

200

Serial Number 00001 208

204

| Temp.(F) Speed (%) | 45 47 49 | 51 53 55 | 57 59 61 | 63 65 67 | 69 71 73 | 75 77 79 | 81 83 85 | 87 89 91 | 93 95 97 | 99 101 103 | 105 107 110 |
|---|---|---|---|---|---|---|---|---|---|---|---|
| 12 | 0.01 | 0.03 | 0.04 | 0.04 | 0.05 | 0.07 | 0.08 | 0.11 | 0.13 | 0.16 | 0.20 |
| 14 | 0.01 | 0.04 | 0.06 | 0.07 | 0.07 | 0.09 | 0.11 | 0.15 | 0.18 | 0.22 | 0.27 |
| 20 | 0.04 | 0.11 | 0.15 | 0.16 | 0.18 | 0.22 | 0.25 | 0.32 | 0.38 | 0.44 | 0.52 |
| 26 | 0.09 | 0.23 | 0.29 | 0.32 | 0.35 | 0.41 | 0.46 | 0.55 | 0.64 | 0.73 | 0.84 |
| 32 | 0.18 | 0.41 | 0.50 | 0.54 | 0.58 | 0.67 | 0.74 | 0.87 | 0.98 | 1.10 | 1.23 |
| 38 | 0.31 | 0.58 | 0.67 | 0.74 | 0.84 | 0.91 | 0.67 | 0.83 | 0.94 | 1.03 | 1.18 |
| 44 | 0.52 | 0.89 | 1.01 | 1.10 | 1.22 | 1.31 | 1.01 | 1.21 | 1.34 | 1.46 | 1.63 |
| 50 | 0.82 | 1.29 | 1.45 | 1.56 | 1.69 | 1.80 | 1.44 | 1.68 | 1.83 | 1.97 | 2.16 |
| 56 | 1.24 | 1.81 | 1.98 | 2.11 | 2.26 | 2.38 | 1.98 | 2.24 | 2.42 | 2.57 | 2.77 |
| 62 | 1.79 | 2.44 | 2.64 | 2.77 | 2.94 | 3.06 | 2.63 | 2.92 | 3.11 | 3.26 | 3.47 |
| 68 | 2.44 | 3.02 | 3.33 | 3.50 | 3.62 | 3.80 | 3.43 | 3.73 | 3.93 | 4.08 | 4.29 |
| 72 | 3.01 | 3.61 | 3.92 | 4.09 | 4.21 | 4.38 | 4.02 | 4.32 | 4.51 | 4.66 | 4.87 |
| 76 | 3.67 | 4.27 | 4.57 | 4.73 | 4.85 | 5.02 | 4.67 | 4.96 | 5.14 | 5.28 | 5.48 |
| 78 | 4.03 | 4.63 | 4.93 | 5.08 | 5.20 | 5.36 | 5.02 | 5.30 | 5.48 | 5.61 | 5.80 |
| 80 | 4.42 | 5.01 | 5.29 | 5.44 | 5.56 | 5.71 | 5.39 | 5.66 | 5.82 | 5.95 | 6.13 |
| 84 | 5.48 | 5.78 | 5.97 | 6.08 | 6.25 | 6.36 | 6.08 | 6.34 | 6.50 | 6.60 | 6.76 |
| 88 | 6.43 | 6.69 | 6.85 | 6.94 | 7.08 | 7.18 | 6.94 | 7.16 | 7.29 | 7.37 | 7.51 |
| 92 | 7.50 | 7.69 | 7.82 | 7.88 | 7.99 | 8.05 | 7.88 | 8.04 | 8.14 | 8.20 | 8.29 |
| 95 | 8.38 | 8.51 | 8.59 | 8.64 | 8.71 | 8.75 | 8.64 | 8.74 | 8.81 | 8.85 | 8.91 |
| 98 | 9.33 | 9.38 | 9.42 | 9.44 | 9.47 | 9.49 | 9.44 | 9.49 | 9.51 | 9.53 | 9.56 |
| 100 | 10.00 | 10.00 | 10.00 | 10.00 | 10.00 | 10.00 | 10.00 | 10.00 | 10.00 | 10.00 | 10.00 |

202

206 Readings taken prior to shipping on May 1, 2016

FIG. 2

300

304

| Temp Diff. / Plant Load (%) | 10 | 12 | 14 | 16 | 18 | 20 | 22 | 24 | 26 | 28 | 30 | 32 |
|---|---|---|---|---|---|---|---|---|---|---|---|---|
| 5 | 288 | 292 | 295 | 299 | 302 | 306 | 309 | 313 | 316 | 320 | 323 | 327 |
| 10 | 299 | 303 | 306 | 310 | 313 | 317 | 321 | 325 | 328 | 332 | 335 | 339 |
| 20 | 330 | 334 | 338 | 342 | 346 | 350 | 354 | 358 | 362 | 366 | 370 | 374 |
| 25 | 360 | 364 | 368 | 373 | 377 | 382 | 386 | 391 | 395 | 400 | 405 | 411 |
| 30 | 381 | 385 | 390 | 394 | 399 | 404 | 408 | 413 | 418 | 423 | 428 | 433 |
| 35 | 403 | 408 | 413 | 417 | 422 | 427 | 432 | 437 | 443 | 448 | 453 | 458 |
| 40 | 426 | 431 | 437 | 442 | 447 | 452 | 457 | 463 | 468 | 474 | 479 | 485 |
| 45 | 454 | 459 | 465 | 470 | 475 | 481 | 487 | 492 | 498 | 504 | 510 | 516 |
| 50 | 483 | 489 | 494 | 500 | 506 | 512 | 518 | 524 | 530 | 536 | 542 | 549 |
| 55 | 514 | 520 | 526 | 532 | 538 | 545 | 551 | 558 | 564 | 571 | 577 | 584 |
| 60 | 547 | 553 | 560 | 566 | 573 | 580 | 586 | 593 | 600 | 607 | 614 | 621 |
| 65 | 582 | 589 | 596 | 603 | 610 | 617 | 624 | 631 | 639 | 646 | 654 | 661 |
| 70 | 619 | 626 | 634 | 641 | 649 | 656 | 664 | 672 | 680 | 688 | 695 | 704 |
| 75 | 659 | 666 | 674 | 682 | 690 | 698 | 707 | 715 | 723 | 732 | 740 | 749 |
| 80 | 701 | 709 | 717 | 726 | 734 | 743 | 752 | 761 | 770 | 779 | 787 | 797 |
| 85 | 746 | 755 | 763 | 772 | 781 | 791 | 800 | 809 | 819 | 829 | 838 | 848 |
| 90 | 794 | 803 | 812 | 822 | 832 | 841 | 851 | 861 | 871 | 882 | 892 | 902 |
| 95 | 844 | 854 | 864 | 875 | 885 | 895 | 906 | 916 | 927 | 938 | 949 | 960 |
| 100 | 899 | 909 | 920 | 931 | 942 | 953 | 964 | 975 | 987 | 998 | 1010 | 1021 |

302

Readings taken prior to shipping on May 1, 2016

FIG. 3A

300

304

| Temp Diff. / Plant Load (%) | 34 | 36 | 38 | 40 | 42 | 44 | 46 | 48 | 50 | 52 | 54 | 55 |
|---|---|---|---|---|---|---|---|---|---|---|---|---|
| 5 | 329 | 305 | 353 | 383 | 450 | 442 | 552 | 537 | 562 | 587 | 608 | 619 |
| 10 | 342 | 316 | 366 | 398 | 467 | 459 | 573 | 557 | 583 | 609 | 631 | 643 |
| 20 | 377 | 350 | 400 | 422 | 513 | 496 | 615 | 598 | 627 | 654 | 677 | 691 |
| 25 | 420 | 416 | 403 | 442 | 527 | 583 | 631 | 634 | 662 | 689 | 715 | 728 |
| 30 | 439 | 440 | 454 | 475 | 494 | 554 | 632 | 656 | 681 | 707 | 734 | 747 |
| 35 | 465 | 465 | 479 | 518 | 544 | 590 | 614 | 662 | 710 | 731 | 761 | 775 |
| 40 | 492 | 492 | 507 | 549 | 576 | 610 | 636 | 665 | 731 | 754 | 783 | 798 |
| 45 | 523 | 524 | 539 | 584 | 613 | 649 | 677 | 683 | 768 | 792 | 823 | 839 |
| 50 | 557 | 557 | 574 | 621 | 652 | 690 | 720 | 727 | 817 | 843 | 876 | 893 |
| 55 | 592 | 593 | 610 | 661 | 694 | 734 | 766 | 773 | 869 | 897 | 932 | 950 |
| 60 | 630 | 631 | 649 | 703 | 739 | 782 | 815 | 823 | 925 | 955 | 992 | 1011 |
| 65 | 671 | 672 | 691 | 748 | 786 | 832 | 868 | 875 | 984 | 1016 | 1055 | 1075 |
| 70 | 714 | 715 | 735 | 796 | 836 | 885 | 923 | 932 | 1047 | 1081 | 1123 | 1144 |
| 75 | 759 | 761 | 782 | 847 | 890 | 942 | 982 | 991 | 1115 | 1150 | 1195 | 1218 |
| 80 | 808 | 809 | 833 | 902 | 947 | 1002 | 1045 | 1055 | 1186 | 1224 | 1271 | 1296 |
| 85 | 860 | 861 | 886 | 959 | 1008 | 1066 | 1112 | 1122 | 1262 | 1302 | 1353 | 1379 |
| 90 | 915 | 916 | 943 | 1021 | 1072 | 1134 | 1183 | 1194 | 1343 | 1386 | 1439 | 1467 |
| 95 | 974 | 975 | 1003 | 1086 | 1141 | 1207 | 1259 | 1271 | 1429 | 1475 | 1532 | 1561 |
| 100 | 1036 | 1037 | 1067 | 1156 | 1214 | 1285 | 1340 | 1352 | 1521 | 1569 | 1630 | 1661 |

302

Readings taken prior to shipping on May 1, 2016

FIG. 3B

400

402

| Design Flow Percentage (%) Impeller Speed Percentage (%) | 3 | 6 | 9 | 12 | 15 | 18 | 21 | 24 | 27 | 30 | 33 | 36 | 39 | 42 | 45 | 48 |
|---|---|---|---|---|---|---|---|---|---|---|---|---|---|---|---|---|
| 5 | n/a | n/a | n/a | n/a | n/a | n/a | n/a | n/a | n/a | n/a | n/a | n/a | n/a | n/a | n/a | n/a |
| 10 | n/a | n/a | n/a | n/a | n/a | n/a | n/a | n/a | n/a | n/a | n/a | n/a | n/a | n/a | n/a | n/a |
| 15 | n/a | n/a | n/a | n/a | n/a | n/a | n/a | n/a | n/a | n/a | n/a | n/a | n/a | n/a | n/a | n/a |
| 20 | 0.1 | 0.1 | 0.2 | 0.3 | 0.3 | 0.4 | n/a | n/a | n/a | n/a | n/a | n/a | n/a | n/a | n/a | n/a |
| 25 | 0.1 | 0.2 | 0.3 | 0.4 | 0.6 | 0.7 | 0.8 | 0.9 | n/a | n/a | n/a | n/a | n/a | n/a | n/a | n/a |
| 30 | 0.2 | 0.4 | 0.5 | 0.7 | 0.9 | 1.1 | 1.2 | 1.4 | 1.6 | 1.8 | n/a | n/a | n/a | n/a | n/a | n/a |
| 35 | 0.3 | 0.6 | 0.8 | 1.1 | 1.4 | 1.7 | 2.0 | 2.2 | 2.5 | 2.8 | 3.1 | n/a | n/a | n/a | n/a | n/a |
| 40 | 0.4 | 0.8 | 1.3 | 1.7 | 2.1 | 2.5 | 2.9 | 3.3 | 3.8 | 4.2 | 4.6 | 5.0 | 5.4 | n/a | n/a | n/a |
| 45 | 0.6 | 1.2 | 1.8 | 2.4 | 3.0 | 3.5 | 4.1 | 4.7 | 5.3 | 5.9 | 6.5 | 7.1 | 7.7 | 8.3 | 8.9 | n/a |
| 50 | 0.8 | 1.6 | 2.4 | 3.2 | 4.0 | 4.8 | 5.7 | 6.5 | 7.3 | 8.1 | 8.9 | 9.7 | 10.5 | 11.3 | 12.1 | 12.9 |
| 55 | 1.1 | 2.1 | 3.2 | 4.3 | 5.4 | 6.4 | 7.5 | 8.6 | 9.6 | 10.7 | 11.8 | 12.8 | 13.9 | 15.0 | 16.1 | 17.1 |
| 60 | 1.4 | 2.8 | 4.2 | 5.5 | 6.9 | 8.3 | 9.7 | 11.1 | 12.5 | 13.9 | 15.2 | 16.6 | 18.0 | 19.4 | 20.8 | 22.2 |
| 65 | 1.8 | 3.5 | 5.3 | 7.0 | 8.8 | 10.5 | 12.3 | 14.0 | 15.8 | 17.6 | 19.3 | 21.1 | 22.8 | 24.6 | 26.3 | 28.1 |
| 70 | 2.2 | 4.4 | 6.6 | 8.7 | 10.9 | 13.1 | 15.3 | 17.5 | 19.7 | 21.9 | 24.1 | 26.2 | 28.4 | 30.6 | 32.8 | 35.0 |
| 75 | 2.7 | 5.4 | 8.0 | 10.7 | 13.4 | 16.1 | 18.8 | 21.5 | 24.1 | 26.8 | 29.5 | 32.2 | 34.9 | 37.5 | 40.2 | 42.9 |
| 80 | 3.2 | 6.5 | 9.7 | 13.0 | 16.2 | 19.5 | 22.7 | 26.0 | 29.2 | 32.5 | 35.7 | 39.0 | 42.2 | 45.5 | 48.7 | 51.9 |
| 85 | 3.9 | 7.8 | 11.7 | 15.5 | 19.4 | 23.3 | 27.2 | 31.1 | 35.0 | 38.9 | 42.7 | 46.6 | 50.5 | 54.4 | 58.3 | 62.2 |
| 90 | 4.6 | 9.2 | 13.8 | 18.4 | 23.0 | 27.6 | 32.2 | 36.8 | 41.4 | 46.0 | 50.6 | 55.2 | 59.8 | 64.4 | 69.0 | 73.6 |
| 95 | 5.4 | 10.8 | 16.2 | 21.6 | 27.0 | 32.4 | 37.8 | 43.2 | 48.6 | 54.0 | 59.4 | 64.8 | 70.2 | 75.6 | 81.0 | 86.4 |
| 100 | 6.3 | 12.6 | 18.9 | 25.1 | 31.4 | 37.7 | 44.0 | 50.3 | 56.6 | 62.9 | 69.1 | 75.4 | 81.7 | 88.0 | 94.3 | 100.6 |

404

Readings taken prior to shipping on May 1, 2016

FIG. 4A

400

402

| Design Flow Percentage (%) Impeller Speed Percentage (%) | 51 | 54 | 57 | 60 | 63 | 66 | 69 | 72 | 75 | 78 | 81 | 84 | 87 | 90 | 93 | 96 | 100 |
|---|---|---|---|---|---|---|---|---|---|---|---|---|---|---|---|---|---|
| 5 | n/a | n/a | n/a | n/a | n/a | n/a | n/a | n/a | n/a | n/a | n/a | n/a | n/a | n/a | n/a | n/a | n/a |
| 10 | n/a | n/a | n/a | n/a | n/a | n/a | n/a | n/a | n/a | n/a | n/a | n/a | n/a | n/a | n/a | n/a | n/a |
| 15 | n/a | n/a | n/a | n/a | n/a | n/a | n/a | n/a | n/a | n/a | n/a | n/a | n/a | n/a | n/a | n/a | n/a |
| 20 | n/a | n/a | n/a | n/a | n/a | n/a | n/a | n/a | n/a | n/a | n/a | n/a | n/a | n/a | n/a | n/a | n/a |
| 25 | n/a | n/a | n/a | n/a | n/a | n/a | n/a | n/a | n/a | n/a | n/a | n/a | n/a | n/a | n/a | n/a | n/a |
| 30 | n/a | n/a | n/a | n/a | n/a | n/a | n/a | n/a | n/a | n/a | n/a | n/a | n/a | n/a | n/a | n/a | n/a |
| 35 | n/a | n/a | n/a | n/a | n/a | n/a | n/a | n/a | n/a | n/a | n/a | n/a | n/a | n/a | n/a | n/a | n/a |
| 40 | n/a | n/a | n/a | n/a | n/a | n/a | n/a | n/a | n/a | n/a | n/a | n/a | n/a | n/a | n/a | n/a | n/a |
| 45 | n/a | n/a | n/a | n/a | n/a | n/a | n/a | n/a | n/a | n/a | n/a | n/a | n/a | n/a | n/a | n/a | n/a |
| 50 | n/a | n/a | n/a | n/a | n/a | n/a | n/a | n/a | n/a | n/a | n/a | n/a | n/a | n/a | n/a | n/a | n/a |
| 55 | 18.2 | 19.3 | n/a | n/a | n/a | n/a | n/a | n/a | n/a | n/a | n/a | n/a | n/a | n/a | n/a | n/a | n/a |
| 60 | 23.5 | 24.9 | 26.3 | 27.7 | n/a | n/a | n/a | n/a | n/a | n/a | n/a | n/a | n/a | n/a | n/a | n/a | n/a |
| 65 | 29.8 | 31.6 | 33.4 | 35.1 | 36.9 | n/a | n/a | n/a | n/a | n/a | n/a | n/a | n/a | n/a | n/a | n/a | n/a |
| 70 | 37.2 | 39.4 | 41.5 | 43.7 | 45.9 | 48.1 | 50.3 | n/a | n/a | n/a | n/a | n/a | n/a | n/a | n/a | n/a | n/a |
| 75 | 45.6 | 48.3 | 51.0 | 53.6 | 56.3 | 59.0 | 61.7 | 64.4 | 67.0 | n/a | n/a | n/a | n/a | n/a | n/a | n/a | n/a |
| 80 | 55.2 | 58.4 | 61.7 | 64.9 | 68.2 | 71.4 | 74.7 | 77.9 | 81.2 | 84.4 | n/a | n/a | n/a | n/a | n/a | n/a | n/a |
| 85 | 66.0 | 69.9 | 73.8 | 77.7 | 81.6 | 85.5 | 89.4 | 93.2 | 97.1 | 101.0 | 115.1 | 115.1 | n/a | n/a | n/a | n/a | n/a |
| 90 | 78.2 | 82.8 | 87.4 | 92.0 | 96.6 | 101.2 | 105.8 | 110.4 | 115.0 | 119.6 | 136.3 | 136.3 | 135.1 | 133.1 | n/a | n/a | n/a |
| 95 | 91.8 | 97.2 | 102.6 | 108.0 | 113.4 | 118.8 | 124.2 | 129.6 | 135.0 | 140.4 | 160.0 | 160.0 | 158.5 | 156.2 | 154.0 | n/a | n/a |
| 100 | 106.9 | 113.1 | 119.4 | 125.7 | 132.0 | 138.3 | 144.6 | 150.9 | 157.1 | 163.4 | 186.3 | 186.3 | 184.5 | 181.9 | 179.2 | 176.6 | 174.0 |

404

Readings taken prior to shipping on May 1, 2016

FIG. 4B

PERFORMANCE PARAMETERIZATION OF PROCESS EQUIPMENT AND SYSTEMS

CROSS-REFERENCE TO RELATED APPLICATION(S)

This application is a continuation application of U.S. application Ser. No. 17/987,207 filed Nov. 15, 2022, which is a continuation application of U.S. application Ser. No. 16/464,568 filed May 28, 2019, which is a U.S. nationalization under 35 U.S.C. § 371 of International Application No. PCT/CA2016/051420 filed Dec. 2, 2016, all the contents of which are herein incorporated by reference.

FIELD

Example embodiments generally relate to process equipment and systems, such as Heating Ventilation and Air Conditioning (HVAC) systems.

BACKGROUND

Building Heating Ventilation and Air Conditioning (HVAC) systems can contain central chilled water plants that are designed to provide air conditioning units with cold water as to reduce the temperature of the air that leaves the conditioned space before it is recycled back into the conditioned space.

Chilled water plants can comprise of active and passive mechanical equipment which work in concert to reduce the temperature of warm return water before supplying it to the distribution circuit.

Chilled water plants can have multiple devices and parts, each of which are responsible for certain functions and work together to achieve a common function, such as cooling of a desired space. As some or all of these components can be interrelated, it may be difficult to identify a particular source of any malfunction or depreciation when the plant is in operation.

Other difficulties with existing systems may be appreciated in view of the Detailed Description of Example Embodiments, herein below.

SUMMARY

Performance mapping of equipment performance parameters is accomplished by generating performance maps which outline the expected feature performance parameter behavior of the equipment based on a set of parameters that capture the operating conditions. A performance parameter can be defined by an individualized set of parameter coefficients which in turn are dependent on instantaneous operating conditions.

With the performance maps set following the manufacturing process, and prior to shipment, post installation activities such as continuous commissioning, monitoring and verification, preventative maintenance, fault detection and diagnostics, as well as energy performance or fluid consumption performance benchmarking and long term monitoring can commence to higher degrees of accuracy than current processes; and can accomplish more informative assessments over the life-cycle of the equipment.

An example embodiment is a method for capturing and mapping equipment performance data of a device for installation in a system, the method including: determining, in relation to testing performed on the device, model values of a performance parameter of the device over an operating range of at least two operating parameters which affect the performance parameter, wherein each model value is representative of an operating point of the at least two operating parameters; storing to memory the determined model values of the performance parameter along with a time of said determining; and comparing, when the device is installed in the system, detected numerical properties of the performance parameter of the device, with respect to the at least two operating parameters, with the stored determined model values of the performance parameter.

Another example embodiment is a parameterization system for capturing and mapping equipment performance data, the parameterization system including: a device for installation in a system, memory, and at least one controller. The at least one controller is configured to: determine, in relation to testing performed on the device, model values of a performance parameter of the device over an operating range of at least two operating parameters which affect the performance parameter, wherein each model value is representative of an operating point of the at least two operating parameters, store to the memory the determined model values of the performance parameter along with a time of said determining, and compare, when the device is installed in the system, detected numerical properties of the device, with respect to the at least two operating parameters, with the stored determined model values of the performance parameter.

The parameterization system can be used for auditing, surveying, and/or acquiring of parameters of individual devices to be installed in the system.

BRIEF DESCRIPTION OF THE DRAWINGS

Reference will now be made, by way of example, to the accompanying drawings which show example embodiments of the present application, and in which:

FIG. 2 illustrates an example two-dimensional performance map modeling a cooling tower fitted with a 10 HP fan motor, in accordance with an example embodiment.

FIGS. 3A and 3B illustrate an example two-dimensional performance map modeling a chiller fitted with a 1500 kW rated compressor, in accordance with an example embodiment.

FIGS. 4A and 4B illustrate an example two-dimensional performance map modeling a pump fitted with a 230 HP motor, in accordance with an example embodiment.

Similar reference numerals may have been used in different figures to denote similar components.

DETAILED DESCRIPTION OF EXAMPLE EMBODIMENTS

At least some example embodiments generally relate to systems that comprise of mechanical equipment that may or may not require electrical power to operate. Where applicable as referenced herein, active mechanical equipment can describe mechanical equipment that requires electrical power to operate. Similarly, passive mechanical equipment can describe mechanical equipment that requires no electrical power to operate.

At least some example embodiments relate to processes, process equipment and systems in the industrial sense, meaning a process that outputs product(s) (e.g. hot water, air) using inputs (e.g. cold water, fuel, air, etc.).

An example embodiment is a method for capturing and mapping equipment performance data of a device for installation in a system, the method including: determining, in relation to testing performed on the device, model values of a performance parameter of the device over an operating range of at least two operating parameters which affect the performance parameter, wherein each model value is representative of an operating point of the at least two operating parameters; storing to memory the determined model values of the performance parameter along with a time of said determining; and comparing, when the device is installed in the system, detected numerical properties of the performance parameter of the device, with respect to the at least two operating parameters, with the stored determined model values of the performance parameter.

Another example embodiment is a parameterization system for capturing and mapping equipment performance data, including: a device for installation in a system, memory, and at least one controller. The at least one controller is configured to: determine, in relation to testing performed on the device, model values of a performance parameter of the device over an operating range of at least two operating parameters which affect the performance parameter, wherein each model value is representative of an operating point of the at least two operating parameters, store to the memory the determined model values of the performance parameter along with a time of said determining, and compare, when the device is installed in the system, detected numerical properties of the device, with respect to the at least two operating parameters, with the stored determined model values of the performance parameter.

Figure 1A:
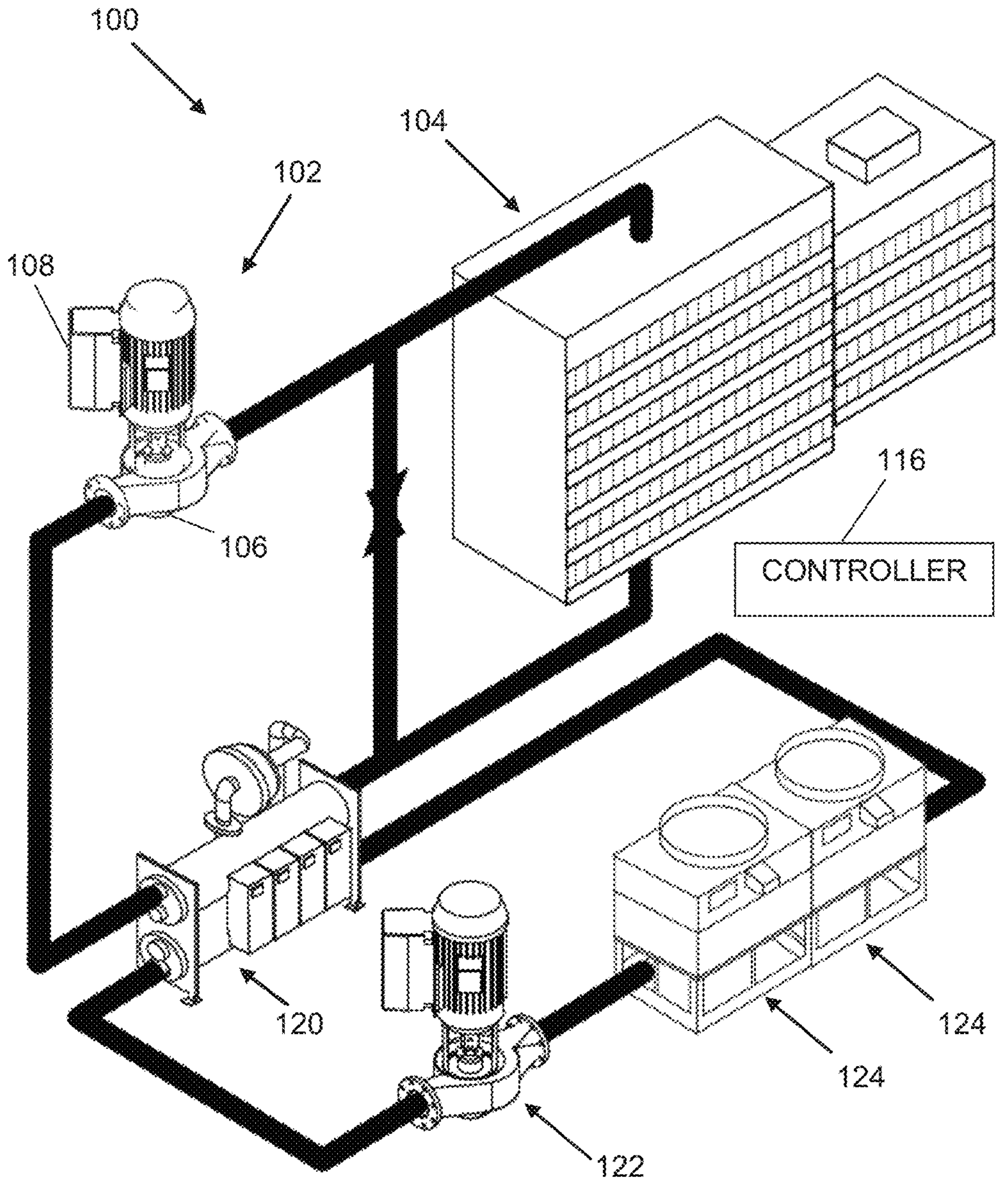
FIG. 1A illustrates a graphical representation of a chilled water plant providing cold water to a building, to which example embodiments may be applied.

FIG. 1A illustrates one such configuration of a HVAC system such as a chilled water plant 100, in accordance with an example embodiment. As shown in FIG. 1A, the chilled water plant 100 can include, for example: one chilled water pump 102, one chiller 120, one condenser water pump 122, and two cooling towers 124. In an example embodiment, more or less numbers of device can exist within each equipment category. Other types of equipment and rotary devices may be included in the chilled water plant 100, in some example embodiments.

The illustrated system can be used to source a building 104 (as shown), campus (multiple buildings), vehicle, plant, generator, heat exchanger, or other suitable infrastructure or load. Each control pump 102 may include one or more respective pump devices 106 and a control device 108 for controlling operation of each pump device 106. The particular circulating medium may vary depending on the particular application, and may for example include glycol, water, air, fuel, and the like. The chiller 120 can include at least a condenser and an evaporator, for example, as understood in the art. Each cooling tower 124 can be dimensioned and configured to provide cooling by way of evaporation, and can include a respective fan, for example. Each cooling tower 124 can include one or more cells, in an example embodiment.

The chilled water plant 100 can be configured to provide air conditioning units of the building 104 with cold water to reduce the temperature of the air that leaves the conditioned space before it is recycled back into the conditioned space. The chilled water plant 100 can comprise of active and passive mechanical equipment which work in concert to reduce the temperature of warm return water before supplying it to the distribution circuit.

Figure 1B:
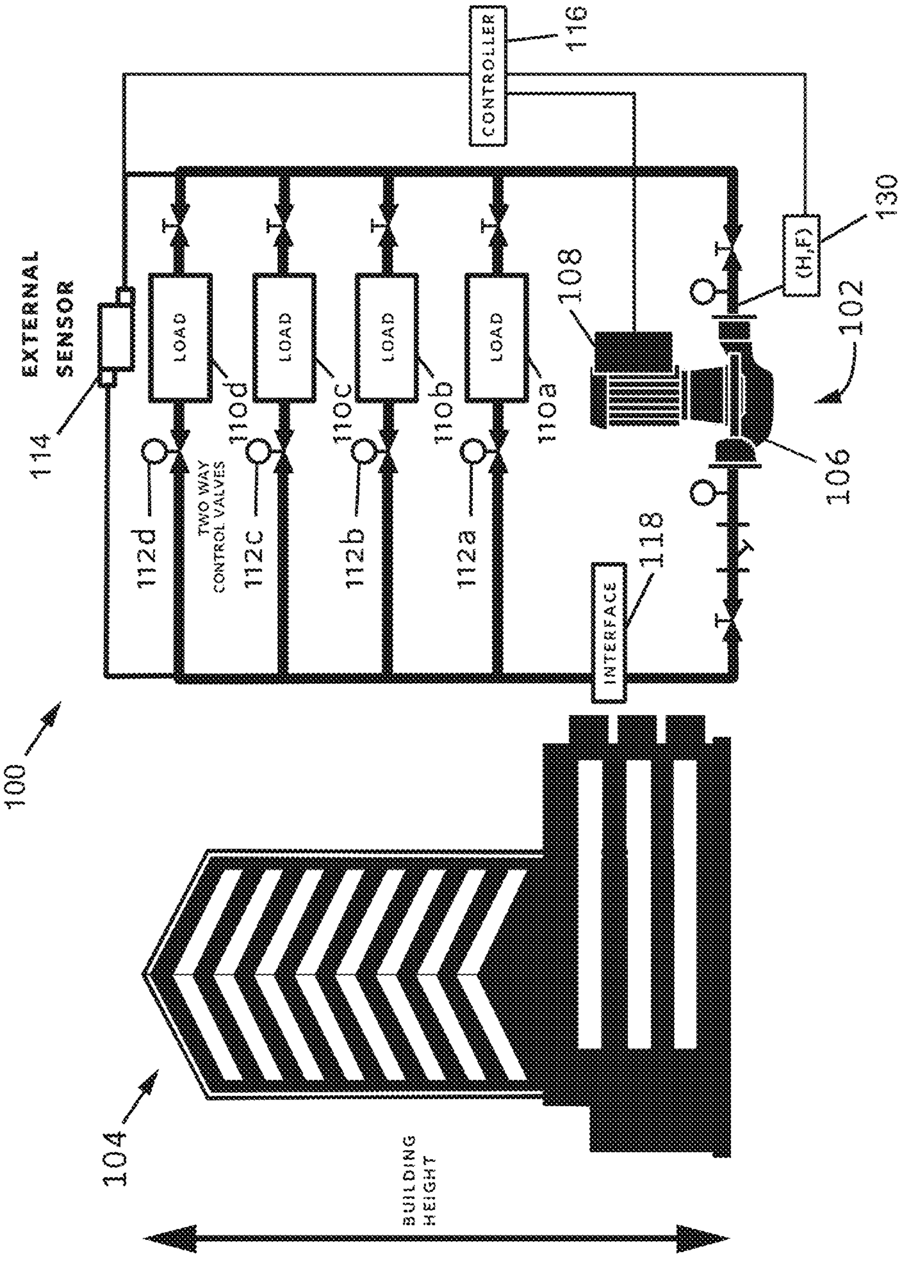
FIG. 1B illustrates another graphical representation of aspects of the chilled water plant shown in FIG. 1A.

Referring to FIG. 1B, the chilled water plant 100 may include an interface 118 in thermal communication with a secondary circulating system, for example via the chiller 120 (FIG. 1A). The chilled water plant 100 may include one or more loads 110*a*, 110*b*, 110*c*, 110*d*, wherein each load may be a varying usage requirement based on air conditioner requirements, HVAC, plumbing, etc. Each 2-way valve 112*a*, 112*b*, 112*c*, 112*d* may be used to manage the flow rate to each respective load 110*a*, 110*b*, 110*c*, 110*d*. In some example embodiments, as the differential pressure across the load decreases, the control device 108 responds to this change by increasing the pump speed of the pump device 106 to maintain or achieve the pressure setpoint. If the differential pressure across the load increases, the control device 108 responds to this change by decreasing the pump speed of the pump device 106 to maintain or achieve the pressure setpoint. In some example embodiments, an applicable load can represent cooling coils to be sourced by the chiller 120, each with associated valves, for example.

Referring still to FIG. 1B, the output properties of each control pump 102 can be controlled to, for example, achieve a pressure setpoint at the combined output properties represented or detected by external sensor 114, shown at a load point of the building 104. The external sensor 114 represents or detects the aggregate or total of the individual output properties of all of the control pumps 102 at the load, in this case, flow and pressure. Information on flow and pressure local to the control pump 102 can also be represented or detected by a respective sensor 130, in an example embodiment. Other example operating parameters are described in greater detail herein.

One or more controllers 116 (e.g. processors) may be used to co-ordinate the output flow of some or all of the devices of the chilled water plant 100. The one or more controllers 116 can include a main centralized controller in some example embodiments, and/or can have some of the functions distributed to one or more of the devices in the overall system of the chilled water plant 100 in some example embodiments. In an example embodiment, the controllers 116 are implemented by a processor which executes instructions stored in memory. In an example embodiment, the controllers 116 are configured to control or be in communication with the loads (110*a*, 110*b*, 110*c*, 110*d*) and/or valves (112*a*, 112*b*, 112*c*, 112*d*).

In an example embodiment, architectures for equipment modeling by performance parameter tracking can be deployed on data logging structures, or control management systems implemented by a controller or processor executing instructions stored in a non-transitory computer readable medium. Previously stored equipment performance parameters stored by the computer readable medium can be compared and contrasted to real-time performance parameter values.

In some example embodiments, a performance parameter of each device performance is modeled by way of model values. In some example embodiments, the model values are discrete values that can be stored in a table, map, database, tuple, vector or multi-parameter computer variables. In some other example embodiments, the model values are values of the performance parameter (e.g. the standard unit of measurement for that particular performance parameter, such as in Imperial or SI metric).

In some example embodiments, the model values are coefficients for the performance parameter. The equipment coefficients are used to prescribe the behavioral responses of the individual units within each equipment group category. Each individual unit within each equipment category can individually be modeled by ascribing each coefficient corresponding to a specific set of operating conditions that transcribe the behavioral parameter in question. The equipment coefficients can be used for direct comparison or as part of one or more equations to model the behavioral parameter. It can be appreciated that individual units can have varied individual behavior parameters, and can be individually modeled and monitored in accordance with example embodiments.

Mathematical models prescribing mechanical equipment efficiency performance have constants and coefficients which parameterize the equations. Specifying these coefficients at the time of manufacturing, and tracking their ability to accurately predict real-time performance through the life-cycle of the mechanical item allows for preventative maintenance, fault detection, installation and commissioning verification, as well as energy performance or fluid consumption performance benchmarking and long term monitoring.

In an example embodiment, control schemes dependent on coefficient based plant modeling architectures can be configured to optimize energy consumption or fluid consumption of individual equipment, or the system as a whole, and monitored over the life-cycle of equipment comprising the central cooling plant. These energy control coefficients can subsequently be adjusted as building, plant, and outdoor environment conditions change over time.

In an example embodiment, a chiller 120 behavioral parameter is modeled as a function of one of several operating parameters relative to its known behavioral response at design operating conditions multiplied by an ascribed coefficient. This relationship is characterized mathematically as:

$$\mathrm{PARAM}_{X_{Perf}}(X_{OP})=A(X_{OP})*\mathrm{PARAM}_{DD}; \quad \text{(Equation 1)}$$

wherein:

$\mathrm{PARAM}_{X_{perf}}$=featured behavioral parameter (selected from one of the operating parameters);

$X_{OP}$=set of operating parameters: [Chilled Water Supply Temperature, Chilled Water Return Temperature, Entering Condenser Water Temperature, Leaving Condenser Water Temperature, Evaporator Flowrate, Condenser Flowrate, Refrigerant Pressure Difference, Temperature Difference, Power, Number of Active Chillers];

$A(X_{OP})$=Individual coefficient multiplier which parameterizes equipment behavioral response at given operating conditions [$X_{OP}$]; and $\mathrm{PARAM}_{DD}$=known feature parameter response at design day conditions.

In an example embodiment, each pump 102, 122 and fan of the cooling tower 124 behavioral parameters are modeled as functions of one of several of their corresponding operating parameters (conditions) relative to their design operating parameters (conditions), raised to the power of an ascribed coefficient. This relationship is characterized mathematically as:

$$\mathrm{PARAM}_{X_{perf}}(X_{OP})=\mathrm{PARAM}_{DD}*[A(X_{OP})]^{B(XOP)}; \quad \text{(Equation 2)}$$

wherein:

$\mathrm{PARAM}_{X_{perf}}$=featured behavioral parameter (selected from one of the operating parameters);

$X_{OP}$=set of operating parameters e.g.: [Impeller Speed, Pump Head Pressure, Power, Wet Bulb Temperature, etc. . . . ];

$A(X_{OP})$=Individual coefficient multiplier which parameterizes equipment behavior response at given operating conditions;

$B(X_{OP})$=Individual coefficient multiplier which parameterizes equipment behavior response at given operating conditions; and $\mathrm{PARAM}_{DD}$=known parameter response at design conditions.

In an example embodiment, the coefficients can be stored as multi-parameter computer variables. In an example embodiment, the coefficients can be stored as one or more N-dimensional tables or maps. In an example embodiment, the coefficients can be stored as one or more databases, or as vectors or tuples.

With behavioral parameters chronicled for all passive and active mechanical equipment within the chilled water plant 100, performance maps can be constructed for each equipment group category, and each unit within each equipment group.

In the case of cooling towers 124, multi-dimensional performance maps can delineate a desired behavioral parameter given a specific set of operating conditions. The span of all possible operating conditions defines the boundaries of the multi-dimensional performance map.

FIG. 2 illustrates an example two-dimensional performance map 200 modeling the cooling tower 124 fitted with a 10 HP fan motor. FIG. 2 also illustrates a timestamp 206 which shows the time of testing, a serial number 208 which are stored in memory along with the map. Therein, power draw (kW) is the modeled behavioral parameter of choice. Fan Speed and Outdoor Temperature function as the bounding operating parameters. For example, the two dimensional Cooling Tower performance map 200 in FIG. 2 illustrates the Power Consumption behavioral parameter being mapped by, for example, two of several possible operating parameters (conditions): Speed Percentage of the Fan Motor 202, and Ambient Temperature 204 (in Fahrenheit).

In the example shown in FIG. 2, with reference to Equation 2 above, PARAM_DD would correspond with the operating conditions that the cooling tower 124 was designed to operate by the designer. Values in the table cells would be considered Param_xperf. For example, a cooling tower 124 could be designed to operate at 85 F with a fan speed of 100%. So in this case, PARAM_DD=10 kW. In this example, it happens that at 100% speed, the fan always operates at 10 kW; irrespective of the temperature. Note however this is not true for all other fan speeds as temperature increases; rather, the power consumed changes as indicated by the map shown in FIG. 2.

For example, with a fan speed of 50%, at 73 F the PARAM_xperf=1.63, and at 53 F the PARAM_xperf=1.29. In such a case, PARAM_DD remains the same, wherein temperature=85, speed=100, and PARAM_DD=10.

In some example embodiments for the cooling tower(s) 124, at least one of the operating parameters comprises: contact air-water area per cooling tower active volume, relative cooling tower volume, entering water temperature, leaving water temperature, wet bulb temperature, power consumed, fluid loss, water flow, and/or air flow.

Similarly, performance maps can be constructed for desirable behavioral parameters for chillers 120 and pumps 102, 122 that tabularize equipment output based on a set of dimensioning operating conditions.

FIGS. 3A and 3B illustrate an example two-dimensional performance map 300 modeling a chiller 120 fitted with a 1500 kW rated compressor. Therein, power draw (kW) is the modeled behavioral parameter of choice. Chiller load percentage 302 and temperature difference 304 (in Fahrenheit) function as the bounding operating parameters, in this example.

In some example embodiments for the chiller 120, at least one of the operating parameters comprises: water flow, refrigerant flow, evaporator entering temperature, evaporator leaving temperature, condenser entering temperature, condenser leaving temperature, refrigerant pressure difference, power consumed, and/or number of active units.

For example, the number of active units can refer to the number of condenser water pumps 122 which are on ("active") for the pumping station of the chiller 120 of interest. As more pumps 122 become active, the total power consumption of the pumping station also increases. This is especially true if the pumps being activated consecutively are specified to operate at the same RPM (speed), as is standard practice. The manner in which the system sequentially "stage-on" and "stage-off" pumps can have an effect on the energy consumed over a period of time. The described mapping of equipment performance processes can allow a supervisory optimization module which references these performance maps, to evaluate and optimize controller automation for example. The number of active units can refer to other types of pumps 102 or active devices, as applicable, in other example embodiments.

FIGS. 4A and 4B illustrate an example two-dimensional performance map 400 modeling a pump 102 fitted with a 230 HP motor. Therein, power draw (kW) is the modeled behavioral parameter of choice. Flow Rate (design flow percentage 402) and Impeller Speed (impeller speed percentage 404) function as the bounding operating parameters.

For example, in the case of FIGS. 4A and 4B, with reference to Equation 1 above, a pump 102 may be selected to provide 100% flow at 100% speed (for example, that is how pumps can be selected for an application), with a corresponding power consumption of 174 kW (the PARAM_DD). However, at other operating conditions, for example 48% flow at 50% speed consuming 13 kW (the PARAM_xperf), the power consumed is described as PARAM_xperf. In this case, the Design Day conditions are a subset of all possible operating conditions.

In an example embodiment, the map 400 includes "N/A" values (null values) which represent operating parameters that would never occur or would not be likely to occur.

In some example embodiments for the pump 102, 122, at least one of the operating parameters comprises: water flow, impeller speed, pump head pressure, pump shaft power draw, number of active units, vibration in x, y, and z plane, and/or noise sound level. Note that vibration can be quantified using at least one of amplitude and frequency, in some example embodiments.

Regarding the equipment performance maps, in an example embodiment, n-dimensional operating parameters may be used to characterize a featured performance parameter of the mechanical item while operating. Given a set of n-parameter coordinates, the map demarcates the expected utilization of the featured performance parameter for the piece of equipment.

The performance maps can be generated at the time of factory testing prior to shipment, post manufacturing. Performance of each device is compared to the maps in real-time, subsequent to installation. In this way, diagnostics, monitoring, and performance verification processes can easily detect degradation in performance for the device, and trigger remedial responses from local or remote operations managers before catastrophic failures can occur, or wasted energy consumption can accrue.

Figure 5:
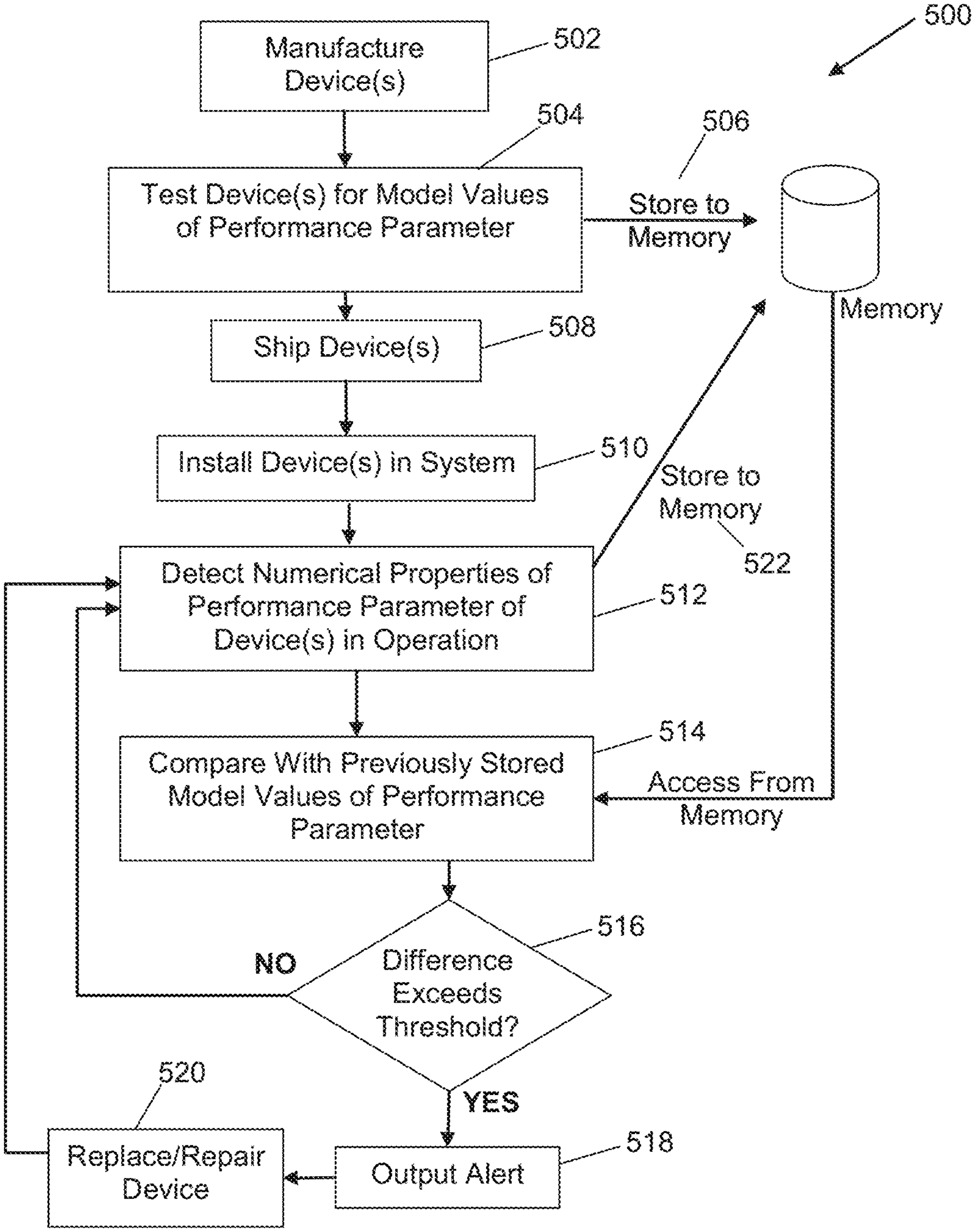
FIG. 5 illustrates a flow diagram of a method for capturing, mapping, and/or structuralizing equipment performance data of a device for installation in a system, in accordance with an example embodiment.

FIG. 5 illustrates a flow diagram of a method 500 for capturing, mapping, and/or structuralizing equipment performance data of a device for installation in a system, in accordance with an example embodiment. For example, the device can be each individual device installed in the chilled water plant 100 (FIG. 1A). In an example embodiment, models values of a performance parameter for each device can be initially determined post manufacturing, and prior to shipment, which individually parameterizes that specific piece of equipment's behavior and performance. This can be conceptually thought of as taking a snapshot of the specific performance of that particular device at a specified point in time.

The parameterization enables modeling, predictive performance, and other operating observations. At any time during the life-cycle of the device, the instantaneous snapshot can be juxtaposed with the original factory tested snapshot recorded at the time of shipment for diagnostics purposes. Further snapshots can be taken over the lifetime of the particular device, so that comparisons can be made with one or more earlier snapshots.

In other words, each individual piece of equipment will have its own individual set of performance parameters, and efficiency coefficients similar to a snapshot taken at a specific point in time. These parameters and/or coefficients can be measured over different times to see what changes have occurred over time.

The equipment model values is the collective aggregation of several behavior and performance assessment tools which characterize the manner in which, and execution of, mechanical equipment performs the tasks that they were designed to accomplish. In an example embodiment, these model values can include at least one or both of the following features: equipment efficiency coefficients and equipment performance maps.

Referring still to FIG. 5, in example embodiments, the method 500 is for capturing, mapping and parameterizing performance of each individual device which are to be installed in a system such as the chilled water plant 100 or other HVAC system. At event 502, the devices for the system, such as the pumps 102, 122, the chiller 120, and the cooling towers 124 (FIG. 1A), are manufactured. It can be appreciated that, in some example embodiments, these devices may be manufactured at different manufacturing facilities, and at different times. A testing facility may be at the manufacturing facility, offsite, or at the installation site in some example embodiments. Some aspects of the method 500 can be performed by one or more controllers, where applicable. In an example embodiment, a central controller 116 is used to perform aspects of the method. In another example embodiment, multiple controllers and/or multiple parties are used to perform the method.

At event 504, after manufacturing and prior to installation or shipping of the devices, each device is tested to determine the model values, e.g. coefficients or values in a standard measurement unit. For example, each device can be tested in a testing facility, wherein the instant operating parameters can be controlled to be at a specific operating point, and then varied over a range for each operating parameter at other specific operating points. For example, the values of a performance parameter such as energy consumed are illustrated in the maps 200, 300, 400 shown in FIGS. 2, 3A and 3B, and 4A and 4B, respectively. In another example, maps for the coefficients can be stored for use with Equations 1 and 2, above. For each device, in an example embodiment, event 504 includes testing for the model values (e.g. coefficients or values) of the performance parameter of the device over an operating range of at least two operating parameters which affect the performance parameter. For example, testing can include varying the operating parameters over the range at different specific operating points. For example, testing can include maintaining some operating parameters constant while varying one or more of the other operating parameters to result in different operating points, and then performing similar testing by varying the next operating parameter of interest. The model values can be determined by storing the values in standard units for each operating point or by calculating a coefficient from each of these tested values. The model values may therefore be stored as discrete values, in association with each operating point.

Each model value is representative of an operating point of the at least two operating parameters. It can be appreciated that, in an example embodiment, more than two operating parameters can be mapped in an N-dimensional map, a database, vector, tuple or a multi-parameter computer variable. The coefficients may be determined by back-calculating using Equation 1, for example. The coefficients may be determined by inferring when there are multiple coefficients such as in the case of Equation 2. In such a case of multi-coefficient equations, inferring can use many Xperf values as coefficients to back-calculate (e.g. at least 2 equations for 2 unknowns). The back-calculated {A,B} coefficients can be inferred to cover a region of the performance map; rather than a single elemental map array entry. This provides a tradeoff of accuracy for gains on implementation simplicity and required RAM/ROM resources needed for realization.

At event 506, the method 500 includes storing in memory the model values of the performance parameter, which can be at least one or both of the determined coefficients or the determined values of the performance parameter. In an example embodiment, this data can be initially stored in one memory such as at the original production facility, and such data is sent and stored to another memory, accessible by the controller 116 of the overall chilled water plant 100 or the overall system.

In an example embodiment, a time of testing is also stored to the memory in associate with the particular device. The stored time can be the actual time and/or date of testing, and/or can be a general statement such as "tested prior to shipping". See, for example, timestamp 206 which shows the date and general statement, and which is stored with the map 200 in FIG. 2.

Still referring to event 506, in an example embodiment, a unique device identifier for the device, such as a serial number 208 or alphanumeric identifier, can be stored in the memory in association with the coefficients/values of the performance parameter. Therefore, for example, each individual device of the same time can be modeled with its own coefficients or values of the performance parameter.

At event 508, the devices are shipped to the destination such as the location of the building 104 (FIG. 1A) where the devices are to be installed. At event 510, the devices are installed in the chilled water plant 100. The chilled water plant 100 then operates as normal with the devices in operation. Operation of one device in the system will affect operation of the other devices. Similarly, operation of one type of device in the system will affect operation of other types of devices.

Typically, the chilled water plant 100 will be subject to a range of N-dimensional operating parameters. The method 500 at event 512 includes detecting, for each device, numerical properties of the performance parameter at the N-dimensional operating parameters. Detecting the numerical properties can include direct measurement or calculating/inferring, as applicable. This allows the coefficients or values of the performance parameter to be measured or calculated. The coefficients can be back-calculated or inferred in real time from measured values of the performance parameter, for example.

Sensors can be used for measuring the applicable information and for providing data in response to the measured information. Data from the sensors can be values in a standard measurement unit, in an example embodiment. Some example sensors 114, 130 are illustrated in FIG. 1B, for example. This allows the controller 116 to model, monitor, audit, survey, acquire, and/or detect the operating parameters and the performance parameters in real-time, and so the controller 116 can provide applicable responses in real-time.

At event 522, the determined numerical properties can also be stored in memory as model parameters. In an example embodiment, these more recent model parameters can be stored as maps, along with a time of acquisition, and the unique identifier of that device.

At event 514, the method 500 includes comparing the detected numerical properties of the performance parameter of each device with any one, some, or all of the previously stored model values of the performance parameter. In an example embodiment, this can include accessing the previously stored data from the memory, which was received or generated at event 506 and/or event 522.

At event 516, the comparison can include calculating a difference such as subtraction or calculation of a ratio or calculation of a percentage difference. The detected numerical properties are compared with any of the previously modeled values, for example using a predetermined rule or criteria. If the difference for all of the devices is within a threshold (if "no"), the method loops to event 512 wherein further measurements and comparisons are to be made. If the threshold is exceed for one of the devices (if "yes"), at event 518 an alert or status notification can be outputted to a display screen or sent to another communication device. The details of the alert may be stored to the memory for future logging and analysis. Therefore, it can be determined which particular device has a potential fault, and further action can be taken. For example, at event 520, the particular device can be replaced or repaired in response. If the device is replaced, in an example embodiment, the performance parameters of the new device were previously determined and stored (e.g. event 504) prior to shipping. If the device is repaired, testing can be performed to determine its new performance parameters, similar to event 504. Those new performance parameters can be stored (similar to event 506) and used for comparison purposes at event 514.

In an example embodiment, the threshold at event 516 is preselected and may be fixed. In some other example embodiments, the threshold at event 518 can change depending on factors such as reasonable wear and age of the device. In an example embodiment, the threshold is dependent on a time difference between the stored timestamp of the model parameters and a time of the presently detected numerical properties. The threshold may be lower for smaller time differences and higher for larger time differences.

In an example embodiment, map-to-map comparison can be made between modeled values taken at different times. For example, one or more performance parameters taken at the same operating parameters can be compared between two different maps taken at two different times.

With reference to the maps 200, 300, 400 (FIGS. 2, 3A, 3B, 4A, 4B), in an example embodiment every single value in the maps do not need to be tested for all operating parameters. Rather, determining discrete values for the maps can comprise measuring values for some of the coefficients/values of the performance parameter by operating the device over some but not all of the operating range with respect to the operating parameters. For the remaining values, these can be inferred or calculated using mathematical routines, for example by interpolating or extrapolating at least some of the coefficients or values of the performance parameter based on the measured values. For example, this can be done by straight-line, quadratic, exponential, or by other forms of interpolation/extrapolation. In an example embodiment, Equations 1 or 2 can be used to assist to interpolate/extrapolate the remaining missing values of the maps. In an example embodiment, the interpolation/extrapolation can be performed ahead of time, for example during event 504 of FIG. 5. In another example embodiment, the interpolation/extrapolation can be performed in real time during event 514 of FIG. 5, wherein the missing values are calculated during actual operation of the devices in the system. For example, the missing coefficient/value may be calculated in real time to determine a coefficient/value for actual measured operating parameters that might exist between two of the already populated map cells.

As well, by storing the model values as discrete values within the maps, complex multi-parameter values can be readily stored and accessed for real-time comparison during operation.

Further, some values on the maps will be outside of an operating range of the operating parameters, and may be impractical or impossible, and can be indicated with a null variable or "N/A", for example. Model values of the performance parameter for these operating parameters do not need to be tested, saving time and resources. If these conditions do occur, in an example embodiment, the applicable model values can be extrapolated as needed.

In some example embodiments, referring again to event 522, this can include storing to memory, during operation of the system, the determined numerical properties of the performance parameter along with the respective measured operating parameters (for example as maps) and the unique identifier of the device. This storing at event 522 can be performed at different points in time, such as periodically, daily, weekly, monthly, annually etc. Accordingly, an ongoing log of the lifetime of the device can be generated, to see trends and to determine when a fault had occurred. For example, normal wear-and-tear or degradation can be expected for some devices, while drastic changes can result in an alert being outputted.

Having the ability to store the model values of the performance parameters for each individual device in the chilled water plant 100, at different times, this information can be used for applications such as to optimize and control of the collective devices in the chilled water plant 100. For example, a consumable variable such as energy consumed or fluid consumed can be optimized in a model for the system as a whole. These energy control coefficients/values can subsequently be adjusted for the model over time, for example as the individual devices degrade or become damaged or if environmental conditions or a design day changes.

In an example embodiment, a model can be used and updated for the device, for example using one or more methods or systems described in Applicant's PCT Patent Application No. PCT/CA2013/050868, published as WO 2014/089694, incorporated herein by reference.

In some example embodiments, the device of interest in the system can include a passive mechanical equipment. Example operating parameters for this (with one being selected as the performance parameter) include: fluid flow through the device (e.g. air or water), pressure differential across the device, ambient or device temperature, energy lost through the device, etc.

Referring again to FIG. 1B, in some example embodiments, the system shown in FIG. 1B can represent a heating circulating system ("heating plant"), with suitable adaptation. The heater plant may include an interface 118 in thermal communication with a secondary circulating system. In an example, control valves manage the flow rate to heating elements (e.g., loads). The control devices 108 can respond to changes in the heating elements by increasing or decreasing the pump speed of the pump device 106 to achieve the specified output setpoint.

Referring again to FIG. 1A, the pump device 106 may take on various forms of pumps which have variable speed control. In some example embodiments, the pump device 106 includes at least a sealed casing which houses the pump device 106, which at least defines an input element for receiving a circulating medium and an output element for outputting the circulating medium. The pump device 106 includes one or more operable elements, including a variable motor which can be variably controlled from the control device 108 to rotate at variable speeds. The pump device 106 also includes an impeller which is operably coupled to the motor and spins based on the speed of the motor, to circulate the circulating medium. The pump device 106 may further include additional suitable operable elements or features, depending on the type of pump device 106. Some device properties of the pump device 106, such as the motor speed and power, may be self-detected by the control device 108.

Referring again to FIG. 1A, the control device 108 for each control pump 102 may include an internal detector or sensor, typically referred to in the art as a "sensorless" control pump because an external sensor is not required. The internal detector may be configured to self-detect, for example, device properties such as the power and speed of the pump device 106. Other input variables may be detected. The pump speed of the pump device 106 may be varied to achieve a pressure and flow setpoint of the pump device 106 in dependence of the internal detector. A program map may be used by the control device 108 to map a detected power and speed to resultant output properties, such as head output and flow output.

The relationship between parameters may be approximated by particular affinity laws, which may be affected by volume, pressure, and Brake Horsepower (BHP). For example, for variations in impeller diameter, at constant speed: $D1/D2=Q1/Q2$; $H1/H2=D1^2/D2^2$; $BHP1/BHP2=D1^3/D2^3$. For example, for variations in speed, with constant impeller diameter: $S1/S2=Q1/Q2$; $H1/H2=S1^2/S2^2$; $BHP1/BHP2=S1^3/S2^3$. Wherein: D=Impeller Diameter (Ins/mm); H=Pump Head (Ft/m); Q=Pump Capacity (gpm/lps); S=Speed (rpm/rps); BHP=Brake Horsepower (Shaft Power—hp/kW).

Variations may be made in example embodiments of the present disclosure. Some example embodiments may be applied to any variable speed device, and not limited to variable speed control pumps. For example, some additional embodiments may use different parameters or variables, and may use more than two parameters (e.g. three parameters on a three dimensional map, or N parameters on a N-dimensional map). Some example embodiments may be applied to any devices which are dependent on two or more correlated parameters. Some example embodiments can include variables dependent on parameters or variables such as liquid, temperature, viscosity, suction pressure, site elevation and number of devices or pump operating.

In example embodiments, as appropriate, each illustrated block or module may represent software, hardware, or a combination of hardware and software. Further, some of the blocks or modules may be combined in other example embodiments, and more or less blocks or modules may be present in other example embodiments. Furthermore, some of the blocks or modules may be separated into a number of sub-blocks or sub-modules in other embodiments.

While some of the present embodiments are described in terms of methods, a person of ordinary skill in the art will understand that present embodiments are also directed to various apparatus such as a server apparatus including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa.

In example embodiments, the one or more controllers can be implemented by or executed by, for example, one or more of the following systems: Personal Computer (PC), Programmable Logic Controller (PLC), Microprocessor, Internet, Cloud Computing, Mainframe (local or remote), mobile phone or mobile communication device.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

Certain adaptations and modifications of the described embodiments can be made. Therefore, the above discussed embodiments are considered to be illustrative and not restrictive.

What is claimed is:

1. A method for a plurality of devices of a system, the method being performed by at least one controller and comprising:

for each device:

determining, in relation to testing performed on the device using a testing facility where instant operating parameters can be controlled to be at a specific operating point, determined model values of a performance parameter of the device over an operating range of at least two operating parameters which affect the performance parameter, wherein each determined model value is representative of an operating point of the at least two operating parameters, the testing performed post manufacturing and prior to installation, commissioning or maintenance of the device, wherein the performance parameter comprises power consumed by the device or a variable in which the power consumed can be inferred;

storing to memory the determined model values of the performance parameter along with a time of said determining and a unique identifier of the device, wherein said determined model values are stored in the memory as a stored multi-dimensional performance vector;

detecting, when the device is installed in the system, during real-time normal operation of the system, detected model values of the performance parameter of the device, with respect to the at least two operating parameters, and storing to the memory the detected model values along with the unique identifier of the device and a time of said detecting, wherein said detected model values are stored in the memory as a detected multi-dimensional performance vector;

comparing, when the device is installed in the system, in real-time during normal operation of the system, the detected multi-dimensional performance vector of the performance parameter of the device, with respect to the at least two operating parameters, with the stored multi-dimensional performance vector and with one or more earlier multi-dimensional performance vectors detected when the device is installed in the system; and updating or optimizing, based on the comparing, a model of the device based on the detected model values of the performance parameter of the device.

2. The method as claimed in claim 1, wherein the testing is further performed pre shipping of the device.

3. The method as claimed in claim 1, wherein operation of one device in the system affects operation of at least one other device in the system with respect to the at least two operating parameters.

4. The method as claimed in claim 1, wherein the system comprises a chilled water plant, a heating circulating system, or a Heating Ventilation and Air Conditioning (HVAC) system.

5. The method as claimed in claim 1, wherein the determining further comprises measuring values of the performance parameter in a standard unit of measurement by operating the device over at least some of the operating range with respect to the at least two operating parameters.

6. The method as claimed in claim 5, wherein said determining further comprises interpolating or extrapolating at least some of the determined model values of the performance parameter based on the measured values.

7. The method as claimed in claim 1, wherein, for said comparing, the method further includes receiving, from one or more respective sensors, when the device is installed in the system, respective data for the at least two operating parameters and/or data for the detected model values of the performance parameter of the device.

8. The method as claimed in claim 1, wherein said comparing comprises exceeding a respective threshold difference.

9. The method as claimed in claim 8, wherein the respective threshold difference is between one or more of the detected model values of the device when installed and one or more of the determined model values of the performance parameter.

10. The method as claimed in claim 8, wherein the respective threshold difference is dependent on a time difference between the time of the detecting and the time of the determining or a time of the one or more earlier multi-dimensional performance vectors.

11. The method as claimed in claim 8, further comprising, in response to said comparing being within the respective threshold difference, repeating the detecting and the comparing.

12. The method as claimed in claim 1, wherein said determining includes receiving the determined model values.

13. The method as claimed in claim 1, wherein the device comprises a mechanical device, a rotary device, and/or a device that requires electricity to operate.

14. The method as claimed in claim 1, wherein at least one of the operating parameters comprises at least one or all of: water flow, impeller speed, pump head pressure, pump shaft power draw, number of active units, vibration, and/or noise sound level.

15. The method as claimed in claim 1, wherein the device comprises a chiller, wherein at least one of the operating parameters comprises at least one or all of: water flow, refrigerant flow, evaporator entering temperature, evaporator leaving temperature, condenser entering temperature, condenser leaving temperature, refrigerant pressure difference, and/or number of active units.

16. The method as claimed in claim 1, wherein the device comprises a cooling tower, wherein at least one of the operating parameters comprises at least one or all of: contact air-water area per cooling tower active volume, relative cooling tower volume, entering water temperature, leaving water temperature, wet bulb temperature, fluid loss, water flow, and/or air flow.

17. The method as claimed in claim 1, wherein the determined model values are discrete values.

18. The method as claimed in claim 1, wherein each determined model value is stored in the memory in association with a respective value of the at least two operating parameters.

19. The method as claimed in claim 1, wherein said detecting the detected model values of the performance parameter of the device when installed is performed by measuring values of the performance parameter in a standard unit of measurement.

20. The method as claimed in claim 1, further comprising, in response to the comparing, outputting an alert or a communication or sending the alert or the communication to a communication device.

21. The method as claimed in claim 1, wherein at least one of the operating parameters is vibration.

22. The method as claimed in claim 1, wherein at least one of the operating parameters comprises an outdoor environmental condition.

23. The method as claimed in claim 1, wherein at least one device comprises a pump, a fan, an air conditioning unit, or a cooling device.

24. The method as claimed in claim 1, wherein at least one of the operating parameters includes at least one of pressure, flow or temperature.

25. A computer device for a plurality of devices of a system, comprising:

memory; and at least one controller configured execution instructions stored in the memory to:

for each device:

determine, in relation to testing performed on the device using a testing facility where instant operating parameters can be controlled to be at a specific operating point, determined model values of a performance parameter of the device over an operating range of at least two operating parameters which affect the performance parameter, wherein each model value is representative of an operating point of the at least two operating parameters, the testing performed post manufacturing and prior to installation, commissioning or maintenance of the device, wherein the performance parameter comprises power consumed by the device or a variable in which the power consumed can be inferred, store to the memory the determined model values of the performance parameter along with a time of said determining and a unique identifier for the device, wherein said model values are stored in the memory as a stored multi-dimensional performance vector, detect, when the device is installed in the system, during real-time normal operation of the system, detected model values of the performance parameter of the device, with respect to the at least two operating parameters, and storing to the memory the detected model values along with the unique identifier of the device and a time of said detecting, wherein said detected model values are stored in the memory as a detected multi-dimensional performance vector, compare, when the device is installed in the system, in real-time during normal operation of the system, the detected multi-dimensional performance vector of the performance parameter of the device, with respect to the at least two operating parameters, with the stored multi-dimensional performance vector and with one or more earlier multi-dimensional performance vectors detected when the device is installed in the system, and update or optimize, based on the comparing, a model of the device based on the detected model values of the performance parameter of the device.

26. A non-transitory computer readable medium including instructions recorded thereon which, when executed by at least one controller, causes the at least one controller to execute the instructions for a plurality of devices of a system, the instructions comprising:

for each device:

instructions for determining, by performing testing on the device using a testing facility where instant operating parameters can be controlled to be at a specific operating point, determined model values of a performance parameter of the device over an operating range of at least two operating parameters which affect the performance parameter, wherein each determined model value is representative of an operating point of the at least two operating parameters, the testing performed post manufacturing and prior to installation, commissioning or maintenance of the device, wherein the performance parameter comprises power consumed by the device or a variable in which the power consumed can be inferred;

instructions for storing to memory the determined model values of the performance parameter along with a time of said determining and a unique identifier of the device, wherein said determined model values are stored in the memory as a stored multi-dimensional performance vector;

instructions for detecting, when the device is installed in the system, during real-time normal operation of the system, detected model values of the performance parameter of the device, with respect to the at least two operating parameters, and storing to the memory the detected model values along with the unique identifier of the device and a time of said detecting, wherein said detected model values are stored in the memory as a detected multi-dimensional performance vector;

instructions for comparing, when the device is installed in the system, in real-time during normal operation of the system, the detected multi-dimensional performance vector of the performance parameter of the device, with respect to the at least two operating parameters, with the stored multi-dimensional performance vector and with one or more earlier multi-dimensional performance vectors detected when the device is installed in the system; and instructions for updating or optimizing, based on the comparing, a model of the device based on the detected model values of the performance parameter of the device.

* * * * *